United States Patent
Lee et al.

(10) Patent No.: US 8,752,078 B1
(45) Date of Patent: Jun. 10, 2014

(54) OBJECTIVE LENS DRIVING UNIT, AND OPTICAL PICKUP DEVICE AND OPTICAL DISC DRIVE INCLUDING THE OBJECTIVE LENS DRIVING UNIT

(71) Applicant: Toshiba Samsung Storage Technology Korea Corporation, Suwon-si (KR)

(72) Inventors: Young-bin Lee, Suwon-si (KR); Min-soo Kang, Seoul (KR); Jae-kuon Yun, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/680,015

(22) Filed: Nov. 17, 2012

(30) Foreign Application Priority Data

Jan. 31, 2012 (KR) .................. 10-2012-0009748

(51) Int. Cl.
   *G11B 7/00* (2006.01)
(52) U.S. Cl.
   USPC ........................... 720/685; 369/44.15
(58) Field of Classification Search
   USPC .................. 369/44.14–44.16; 720/681–685
   See application file for complete search history.

(56) References Cited

U.S. PATENT DOCUMENTS

| | | | | |
|---|---|---|---|---|
| 6,246,531 B1 * | 6/2001 | Hori et al. | ................... | 369/44.14 |
| 6,633,519 B2 * | 10/2003 | Park et al. | ................... | 369/44.14 |
| 2001/0028621 A1 * | 10/2001 | Moriyama | ............... | 369/112.23 |
| 2003/0161251 A1 * | 8/2003 | Shimada et al. | ........... | 369/44.16 |
| 2005/0141358 A1 * | 6/2005 | Kim | ........................... | 369/44.15 |

FOREIGN PATENT DOCUMENTS

| | | | | |
|---|---|---|---|---|
| JP | 2003-281757 | 10/2003 | | |
| JP | 2006-040463 | 2/2006 | | |
| JP | 2008-159210 | 7/2008 | | |
| JP | 2008-310916 | 12/2008 | | |
| KR | 2003-0062895 A | * | 7/2003 | ............ G11B 7/085 |
| KR | 10-0557521 | 2/2006 | | |

OTHER PUBLICATIONS

English translation of KR 2003-0062895 A.*
Korean Office Action issued on Dec. 12, 2012 in counterpart Korean Patent Application No. 10-2012-0009748 (3 pages, in Korean).

* cited by examiner

*Primary Examiner* — Nathan Danielsen
(74) *Attorney, Agent, or Firm* — NSIP Law

(57) ABSTRACT

Provided is an objective lens driving unit that includes a moving structure including an objective lens and a driving coil, a yoke and a fixed portion extending from the yoke, and a wire holder that has a first surface and a second surface that is adjacent to the first surface. The fixed portion of the yoke is integrally bonded to the first surface, and a terminal unit comprising a plurality of interconnection layers is embedded on the second surface. The objective lens driving unit also includes a plurality of suspension wires that connect the driving coil to the terminal unit of the wire holder.

18 Claims, 5 Drawing Sheets

OBJECTIVE LENS DRIVING UNIT, AND OPTICAL PICKUP DEVICE AND OPTICAL DISC DRIVE INCLUDING THE OBJECTIVE LENS DRIVING UNIT

CROSS-REFERENCE TO RELATED APPLICATION(S)

This application claims the benefit under 35 USC §119(a) of Korean Patent Application No. 10-2012-0009748, filed on Jan. 31, 2012 in the Korean Intellectual Property Office, the entire disclosure of which is incorporated herein by reference for all purposes.

BACKGROUND

1. Field

The following description relates to an objective lens driving unit, and more particularly, to an objective lens driving unit that is easier to assemble.

2. Description of Related Art

An objective lens driving unit of an optical pickup device typically has a structure of a voice coil motor (VCM). The typical objective lens driving unit includes a static structure including a permanent magnet and a yoke, and a moving structure including a driving coil and an objective lens. In a typical structure, the moving structure is supported with respect to the static structure by a plurality of suspension wires. The suspension wires also function as an electrical connection for applying a driving voltage to a driving coil to control focusing and tracking of the objective lens.

An optical pickup device for a slim optical disc drive such as that used in a notebook computer structurally consists of small parts. Accordingly, assembling thereof is difficult, and product characteristics may have a wide range of dispersion due to assembly misalignment.

SUMMARY

In an aspect, there is provided an objective lens driving unit for an optical disc drive, the objective lens driving unit including a moving structure comprising an objective lens and a driving coil, a yoke structure comprising a magnet corresponding to the driving coil, a yoke supporting the magnet, and a fixed portion extending from the yoke, a wire holder comprising a first surface and a second surface that is adjacent to the first surface, wherein the fixed portion of the yoke structure is integrally bonded to the first surface by molding, and a terminal unit comprising a plurality of interconnection layers is embedded in the second surface, and a plurality of suspension wires that connect the driving coil to the terminal unit of the wire holder.

An opening may be formed on the first surface of the wire holder in which the fixed portion of the yoke structure is embedded and the opening may expose the fixed portion.

The interconnection layers may comprise an interconnection layer for grounding which extends toward a corner between the first surface and the second surface of the wire holder, and a protruding portion which extends from the fixed portion of the yoke structure exposed through the opening to the interconnection layer for grounding and is electrically connected to the interconnection layer for grounding.

The protruding portion may extend from a center of an edge of the fixed portion.

The objective lens driving unit may further comprise a protection cover that protects the moving structure and which is electrically connected to the interconnection layer for grounding.

The interconnection layer for grounding may be located at the center of the second surface and the other interconnection layers may be disposed on both sides of the interconnection layer for grounding.

The terminal unit may comprise a terminal substrate that is embedded and fixed in the wire holder, and the interconnection layers may be formed on the terminal substrate.

The interconnection layers may be directly embedded and fixed in the second surface of the wire holder.

In an aspect, there is provided an optical pickup device including a moving structure comprising an objective lens and a driving coil, a static structure comprising a yoke structure comprising a magnet corresponding to the driving coil, a yoke supporting the magnet, and a fixed portion extending from the yoke, a wire holder comprising a first surface and a second surface that is adjacent to the first surface, wherein a fixed portion of the yoke structure is integrally formed by molding on the first surface and a terminal unit comprising a plurality of interconnection layers is embedded in the second surface, and a plurality of suspension wires connecting the driving coil to the interconnection layers, and a base that supports the static structure and which comprises a light source and a light-receiving device.

An opening may be formed on the first surface of the wire holder in which the fixed portion of the yoke structure is embedded and the opening may expose the fixed portion.

The interconnection layers may comprise an interconnection layer for grounding which extends toward a corner between the first surface and the second surface of the wire holder, and a protruding portion which extends from the fixed portion of the yoke structure exposed through the opening to the interconnection layer for grounding at the corner and which is electrically connected to the interconnection layer for grounding.

The protruding portion may extend from a center of an edge of the fixed portion.

The fixed portion may be fixed on the second surface of the wire holder which is adjacent to the first surface, and the protruding portion of the fixed portion may be electrically connected to the interconnection layer for grounding through a corner between the first surface and the second surface.

The terminal unit may comprise a terminal substrate that is embedded and fixed in the wire holder, and the interconnection layers may be formed on the terminal substrate.

The interconnection layers may be directly embedded and fixed in the second surface of the wire holder.

In an aspect, there is provided an optical disc drive comprising the optical pickup device.

Other features and aspects may be apparent from the following detailed description, the drawings, and the claims.

Figure 1:
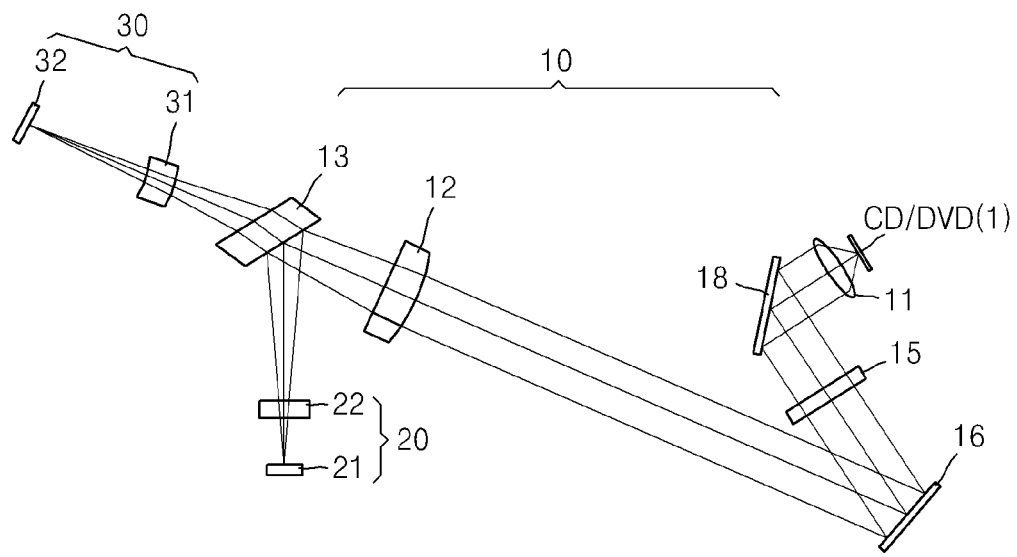
FIG. 1 is a diagram illustrating an example of a CD/DVD optical pickup device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an optical pickup device for CD and/or DVD.

Referring to FIG. 1, the optical pickup device includes a light transmission system 10, a light source system 20 for supplying a plurality of beams for regenerating and/or recording information with respect to a medium 1, and a light receiving system 30. For example, the light source system 20 may supply three beams including a main beam and first and second sub beams located on both sides of the main beam. The light receiving system 30 may generate an electric signal, such as a data signal or a tracking error signal (TES) for processing to regenerate information by a light-receiving device 32. In this example, the light receiving device 32 may include three light-receiving cells for receiving three beams reflected by the medium 1.

The light source system 20 includes a light source 21 for CD/DVD, and a diffraction device 22. A beam may be incident from the light source 21 to a first beam splitter 13 through the diffraction device 22. The diffraction device 22 may form a main beam and ±1 order sub beams from a beam transmitted by the light source 21 using diffraction effects.

The light receiving system 30 includes a light-receiving device 32 for generating an electrical signal by detecting beams that have been reflected from the medium 1 and that have passed through the first beam splitter 13, and a sensing lens 31 for focusing the main beam and the first and second sub beams located on both sides of the main beam in an intensity with respect to the light-receiving device 32.

The light transmission system 10 includes an objective lens 11 corresponding to the medium 1, path change mirrors 16 and 18, a quarter wave plate (QWP) 15, a collimating lens 12, and a first beam splitter 13. The first beam splitter 13 may reflect three beams transmitted by the light source system 20 toward the objective lens 11, and transmits light beams that return after being reflected from the medium 1 to enter into the light receiving system 30.

Figure 2:
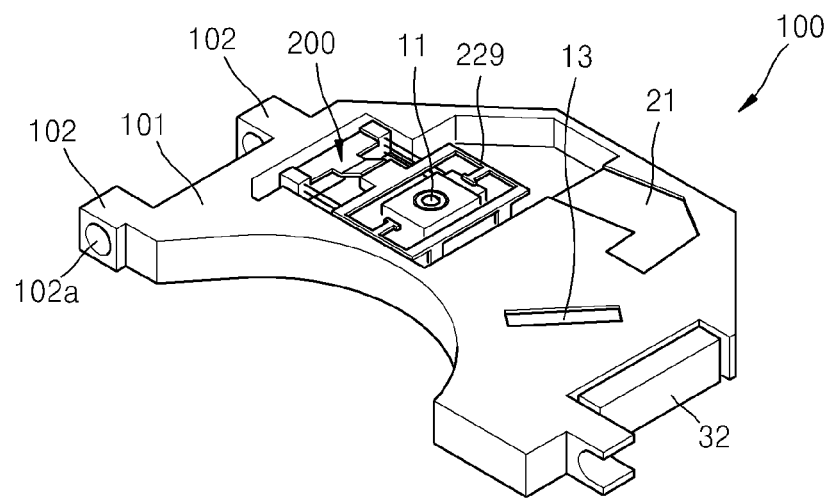
FIG. 2 is a diagram illustrating an example of an optical pickup device.

FIG. 2 illustrates an example of an optical pickup device.

Referring to FIG. 2, an assembly base 100 includes a plurality of optical parts. For example, the assembly base 100 may be formed by aluminum die casting or plastic molding. The assembly 100 may have a predetermined thickness.

The assembly base 100 includes an objective lens driving unit 200. The objective lens driving unit 200 includes the objective lens 11 and a protecting cover 229 covering a surrounding of the objective lens 11. In addition, the assembly base 100 may also include the previously described optical parts, for example, the beam splitter 13, the light source 21, the light-receiving device 32, the beam splitter 13, the light source 21, and the light-receiving device 32, which may be arranged as illustrated in FIG. 1. Meanwhile, a shaft guide 101 that has a cylindrical hole 102a is formed on a side of the assembly base 100. Arms 102 extend out from the shaft guide 101 and include the cylindrical hole 102a. The shaft guide 101 may receive a guide shaft (not shown) of an optical disc drive apparatus inserted therein.

Figure 3:
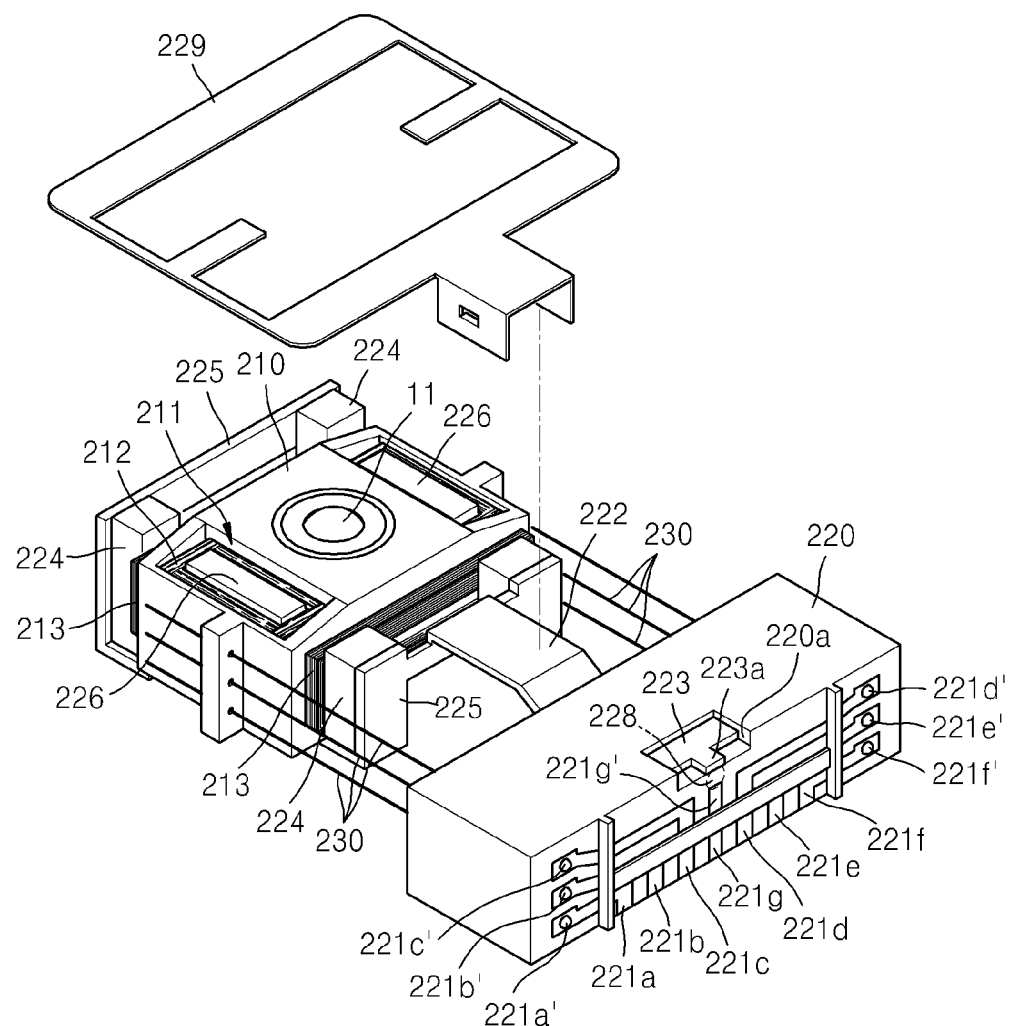
FIG. 3 is a diagram illustrating an example of an objective lens driving unit.
Figure 4:
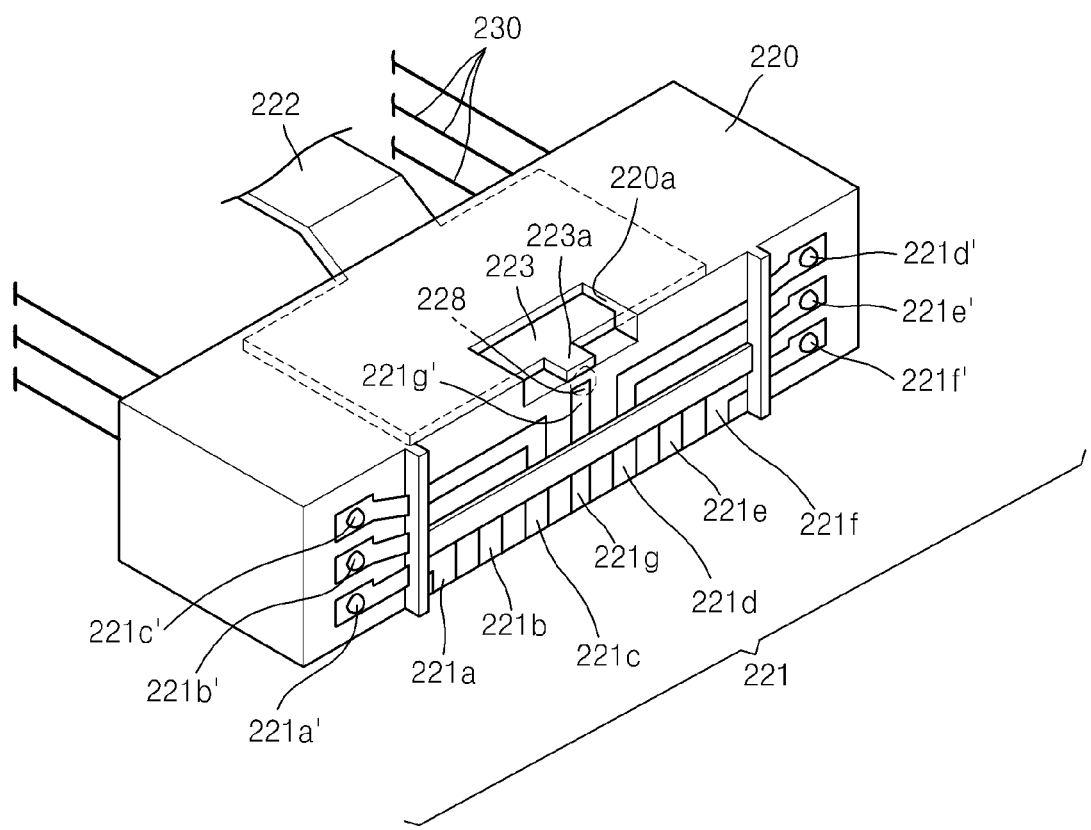
FIG. 4 is a diagram illustrating an example of a wire holder used in an objective lens driving unit.
Figure 5:
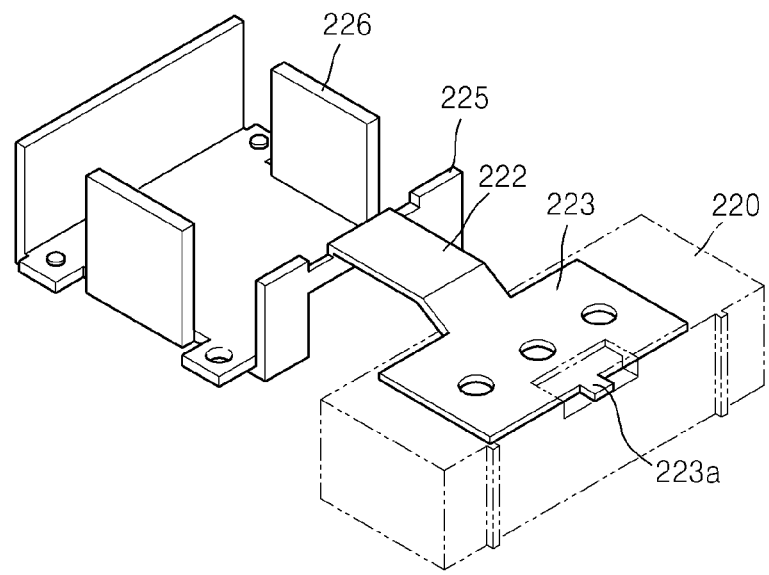
FIG. 5 is a diagram illustrating an example of a yoke structure used in an objective lens driving unit.

FIG. 3 illustrates an example of the objective lens driving unit 200 included in the optical pickup device illustrated in FIGS. 1 and 2. FIG. 4 illustrates an example of a wire holder 220 included in the objective lens driving unit 200. FIG. 5 illustrates an example of a yoke structure.

Referring to FIGS. 3 and 4, the objective lens 11 is installed at the center of an upper surface of a frame 210 of a moving structure. In this example, the frame 210 is a square frame. A surrounding of the objective lens 11 is covered by the protecting cover 229. First driving coils 212 for focusing operation of the objective lens 11 are installed on inner circumference surfaces of rectangular through-holes 211 and disposed on both sides of the frame 210. In addition, second driving coils 213 for tracking operations are attached on an outer surface of the frame 210.

In this example, the static structure includes permanent magnets 224 and a yoke structure that includes surrounding yokes 225 and central yokes 226 on which the permanent magnets 224 are fixed. The surrounding yokes 225 face the second driving coils 213, respectively, and are in the form of a column. The central yokes 226 are respectively located at the center of each of the through-holes 211. The permanent magnets 224 are fixed on an inner surface of the surrounding yokes 225 and face the second driving coils 213, respectively.

FIG. 5 illustrates an example of a side of a yoke structure. Referring to FIG. 5, a fixed portion 223 is embedded and fixed in an upper surface of a wire holder 220. A connection portion 222 is disposed between the yoke structure and the fixed portion 223. The connection portion 222 is coupled to an end of the protecting cover 229. Accordingly, the protecting cover 229 and the surrounding yoke 225 and the central yoke 226 are electrically connected to each other, and are grounded to the outside through an interconnection layer 221g for grounding.

Referring again to FIGS. 3 and 4, the static structure includes the wire holder 220, the surrounding yokes 225 and the central yokes 226, and the permanent magnets 224. The static structure supports the frame 210 of the moving structure through suspension wires 230. On a rear surface of the wire holder 220 is a terminal unit 221 for supplying an electrical signal to the first and second driving coils 212 and 213.

Figure 6:
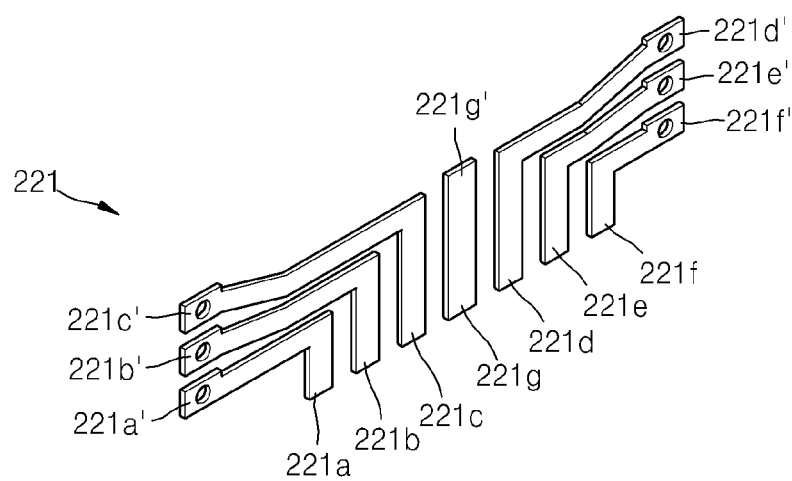
FIG. 6 is a diagram illustrating an example of a terminal unit used in an objective lens driving unit.

According to various aspects, the terminal unit 221 may include a plurality of interconnection layers 221a to 221g that are embedded and fixed in the second surface of the wire holder 220. An example of the interconnection layers 221a to 221g is illustrated in FIG. 6. An interconnection layer is used in the form of a lead frame in an extraction process for manufacturing a wire holder. For example, the wire holder 220 having the rear surface in which the interconnection layers 221a to 221g are embedded and fixed may be manufactured by injection molding. In this example, the interconnection layers 221a to 221g may be located as inserts in given locations within the mold.

Rear ends of the suspension wires 230 passing through both sides of the wire holder 220 are fixed to one side of terminals 221a' to 221f' of the interconnection layers 221a to 221f which are located on left and right-hand side edges of the rear surface of the wire holder 220. In addition, lower ends of the interconnection layers 221a to 221g are aligned in one row on a lower portion of the rear surface of the wire holder 220. The other side of the terminals of the interconnection layers 221a to 221g are connected to an external circuit. In this example, the interconnection layer 221g is for grounding and includes a terminal 221g' that is adjacent to a protruding portion 223a of the fixed portion 223. The terminal 221g' is adjacent to a protruding portion 223a protruding from the fixed portion 223, and the terminal 221g' and the protruding portion 223a are connected to each other, for example, by a solder 228.

Accordingly, the protecting cover 229 and the surrounding yokes 225 are connected to a grounding portion of an external circuit, and thus, may protect a circuit of an optical pickup device from an external electric impact, such as ESD. In this example, the protruding portion 223a of the fixed portion 223 is exposed to the outside through an opening 220a formed on the upper surface of the wire holder 220. Also, the terminal 221g' for grounding and the protruding portion 223a are electrically connected to each other by the solder 228 at the opening 220a.

Meanwhile, the other ends of the suspension wires 230 are electrically connected to the first driving coils 212 while being fixed on both side surfaces of the frame 210.

Figure 7:
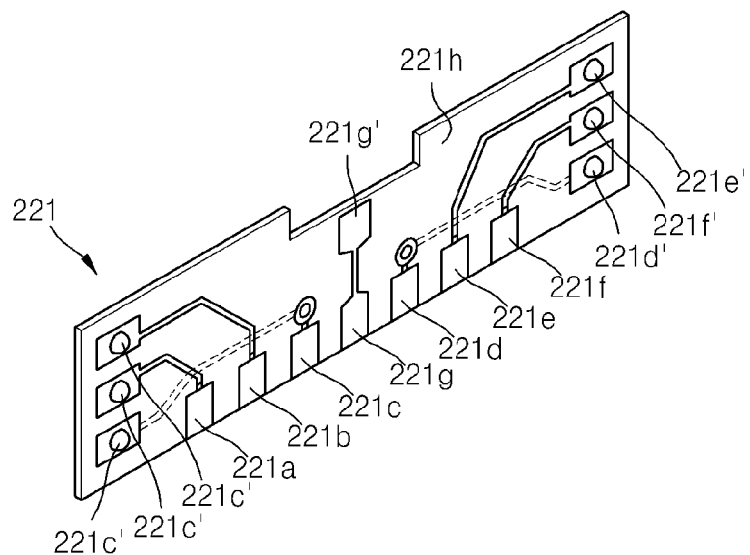
FIG. 7 is a diagram illustrating another example of a terminal unit.
Figure 8:
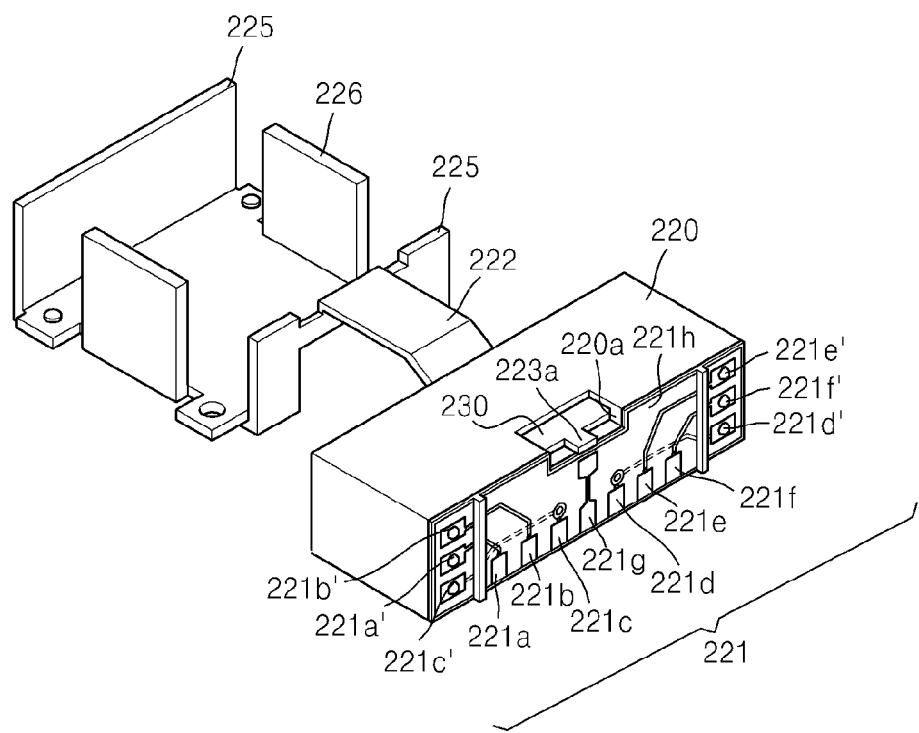
FIG. 8 is a diagram illustrating another example of a wire holder and a yoke structure including the terminal unit of FIG. 7.

According to various aspects, the terminal unit 221 includes the interconnection layers 221a to 221f that are directly embedded in the wire holder 220. However, as illustrated in FIG. 7, a terminal unit may include a terminal substrate 221h embedded in the wire holder 220, and the interconnection layers 221a to 221f may be formed on the terminal substrate 221a. As another example, the terminal substrate 221h may be embedded in the second surface, that is, the rear surface of the wire holder 220 as illustrated in FIG. 8. The terminal substrate 221a may be used as an insert in manufacturing the wire holder 220 together with the fixed portion 223 having the yoke structure. For example, the wire holder 220 having the rear surface on which the terminal substrate 221h is embedded, may be manufactured by injection molding, and the terminal substrate 221h and the fixed portion 223 may be located as inserts at given locations inside a mold.

According to various aspects, a yoke structure and a terminal unit of the optical disc drive are integrally fixed with respect to a wire holder by molding. Accordingly, a separate process is not needed to fix the yoke structure and the terminal unit with respect to the wire holder. In addition, because the yoke structure and the terminal unit are fixed as one body through the injection molding process for forming the wire holder, a characteristics dispersion range of products may be reduced. In addition, an assembling process for binding the yoke structure and the terminal unit is not needed, and in a production line, the yoke structure and the terminal unit are handled as one component. Accordingly, manufacturing costs may be reduced compared to in the conventional optical disc drive.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An objective lens driving unit for an optical disc drive, the objective lens driving unit comprising:
   a moving structure comprising an objective lens and a driving coil;
   a yoke structure comprising a magnet corresponding to the driving coil, a yoke supporting the magnet, and a fixed portion extending from the yoke;
   a wire holder comprising a first surface and a second surface that is adjacent to the first surface, wherein the fixed portion of the yoke structure is integrally bonded to the first surface by molding, and a terminal unit comprising a plurality of interconnection layers is embedded in the second surface; and
   a plurality of suspension wires that connect the driving coil to the terminal unit of the wire holder, wherein
   an opening is formed on the first surface of the wire holder in which the fixed portion of the yoke structure is embedded and the opening exposes the fixed portion.

2. The objective lens driving unit of claim 1, wherein the interconnection layers comprise an interconnection layer for grounding which extends toward a corner between the first surface and the second surface of the wire holder, and a protruding portion which extends from the fixed portion of the yoke structure exposed through the opening to the interconnection layer for grounding and is electrically connected to the interconnection layer for grounding.

3. The objective lens driving unit of claim 2, wherein the protruding portion extends from the center of an edge of the fixed portion.

4. The objective lens driving unit of claim 2, further comprising a protection cover that protects the moving structure and which is electrically connected to the interconnection layer for grounding.

5. The objective lens driving unit of claim 2, wherein the interconnection layer for grounding is located at the center of the second surface and the other interconnection layers are disposed on both sides of the interconnection layer for grounding.

6. The objective lens driving unit of claim 1, wherein the interconnection layers are directly embedded and fixed in the second surface of the wire holder.

7. An objective lens driving unit for an optical disc drive, the objective lens driving unit comprising:
   a moving structure comprising an objective lens and a driving coil;
   a yoke structure comprising a magnet corresponding to the driving coil, a yoke supporting the magnet, and a fixed portion extending from the yoke;
   a wire holder comprising a first surface and a second surface that is adjacent to the first surface, wherein the fixed portion of the yoke structure is integrally bonded to the first surface by molding, and a terminal unit comprising a plurality of interconnection layers is embedded in the second surface; and
   a plurality of suspension wires that connect the driving coil to the terminal unit of the wire holder, wherein
   the terminal unit comprises a terminal substrate that is embedded and fixed in the wire holder, and the interconnection layers are formed on the terminal substrate.

8. An optical pickup device comprising:
   a moving structure comprising an objective lens and a driving coil;
   a static structure comprising:
   a yoke structure comprising a magnet corresponding to the driving coil, a yoke supporting the magnet, and a fixed portion extending from the yoke,
   a wire holder comprising a first surface and a second surface that is adjacent to the first surface, wherein the fixed portion of the yoke structure is integrally formed by molding on the first surface and a terminal unit comprising a plurality of interconnection layers is embedded in the second surface, and a plurality of suspension wires connecting the driving coil to the interconnection layers; and a base that supports the static structure and which comprises a light source and a light-receiving device, wherein an opening is formed on the first surface of the wire holder in which the fixed portion of the yoke structure is embedded and the opening exposes the fixed portion.

9. The optical pickup device of claim 8, wherein the interconnection layers comprise an interconnection layer for grounding which extends toward a corner between the first surface and the second surface of the wire holder, and a protruding portion which extends from the fixed portion of the yoke structure exposed through the opening to the interconnection layer for grounding at the corner and which is electrically connected to the interconnection layer for grounding.

10. The optical pickup device of claim 9, wherein the protruding portion extends from the center of an edge of the fixed portion.

11. The optical pickup device of claim 10, wherein the fixed portion is fixed on the second surface of the wire holder which is adjacent to the first surface, and the protruding portion of the fixed portion is electrically connected to the interconnection layer for grounding through a corner between the first surface and the second surface.

12. The optical pickup device of claim 8, wherein the terminal unit comprises a terminal substrate that is embedded and fixed in the wire holder, and the interconnection layers are formed on the terminal substrate.

13. The optical pickup device of claim 8, wherein the interconnection layers are directly embedded and fixed in the second surface of the wire holder.

14. An optical disc drive comprising the optical pickup device of claim 8.

15. The optical disc drive of claim 14, wherein a protruding portion extends from the center of an edge of the fixed portion.

16. The optical disc drive of claim 15, wherein the protruding portion of the fixed portion is electrically connected to the interconnection layer for grounding through a corner between the first surface and the second surface.

17. The optical disc drive of claim 14, wherein the terminal unit comprises a terminal substrate that is embedded and fixed in the wire holder, and the interconnection layers are formed on the terminal substrate.

18. An objective lens driving device for an optical disc drive, the device comprising:

a wire holder comprising a first surface and a second surface that is adjacent to the first surface;

a terminal unit comprising a plurality of interconnection layers, the terminal unit configured to be embedded in the second surface; and a yoke configured to support a magnet, driving coil, and objective lens of the driving device, to be integrally bonded to the first surface of the wire holder by molding, and to extend beyond the second surface of the wire holder and make contact with one of the interconnection layers of the terminal unit.

* * * * *